(12) United States Patent
Hirvonen

(10) Patent No.: US 9,285,220 B2
(45) Date of Patent: Mar. 15, 2016

(54) NAVIGATION SYSTEM AND METHOD

(76) Inventor: Jouni Hirvonen, Suonenjoki (FI)

(*) Notice: Subject to any disclaimer, the term of this patent is extended or adjusted under 35 U.S.C. 154(b) by 0 days.

(21) Appl. No.: 14/238,969

(22) PCT Filed: Aug. 31, 2012

(86) PCT No.: PCT/FI2012/050847
§ 371 (c)(1),
(2), (4) Date: Feb. 14, 2014

(87) PCT Pub. No.: WO2013/030460
PCT Pub. Date: Mar. 7, 2013

(65) Prior Publication Data
US 2014/0229111 A1  Aug. 14, 2014

(30) Foreign Application Priority Data
Aug. 31, 2011 (FI) .................................... 20115847

(51) Int. Cl.
*G01C 21/34* (2006.01)
*G01C 21/00* (2006.01)
*G09B 29/10* (2006.01)

(52) U.S. Cl.
CPC ............... *G01C 21/00* (2013.01); *G09B 29/10* (2013.01)

(58) Field of Classification Search
CPC .............................. G01C 21/00; G01C 21/04

USPC ......... 701/454, 533, 431, 532, 400, 409, 410, 701/451
See application file for complete search history.

(56) References Cited

U.S. PATENT DOCUMENTS

| | | | | |
|---|---|---|---|---|
| 8,849,560 B2 * | 9/2014 | Stefani et al. | ................. | 701/400 |
| 2012/0143495 A1 * | 6/2012 | Dantu | .......................... | 701/428 |

FOREIGN PATENT DOCUMENTS

| | | |
|---|---|---|
| DE | 19854126 | 6/2000 |
| DE | 202009016198 | 4/2010 |
| DE | 102009048896 | 5/2010 |
| JP | 2002-163691 | 6/2002 |
| JP | 2005-10731 | 4/2005 |

OTHER PUBLICATIONS

Office Action in corresponding European patent application No. 12827513, dated Mar. 10, 2015.
English language abstract of corresponding document WO2010040541.

* cited by examiner

*Primary Examiner* — Luke Huynh
(74) *Attorney, Agent, or Firm* — Fildes & Outland, P.C.

(57) ABSTRACT

The invention relates to a navigation system, which includes an appliance for finding a desired route from a starting point to an end point. The navigation system includes explicit markings discernible by the senses, which are located on the route, and the markings on the route are arranged in the appliance in the order of progression. The invention also relates to a navigation method.

13 Claims, 5 Drawing Sheets

NAVIGATION SYSTEM AND METHOD

TECHNICAL FIELD

The present invention relates to a navigation system, which includes an appliance for finding a route from a starting point to an end point. The invention also relates to a navigation method.

BACKGROUND OF THE INVENTION

In both terrain and cities, a traditional map can be used for navigation. In other words, a location marked on the map is sought with the aid of the terrain. However, navigation based on a map and fixed points in the environment requires skill. Nowadays, it is also possible to use a mobile device for navigation. However, a mobile device is expensive and requires a functioning data network.

Particularly when navigating over short distances, along which there are many people, both the accuracy and the usability of the aforementioned appliances are insufficient. The accuracy of a map is poor and fixed points are difficult to distinguish among a crowd of people. In a crowd, it is difficult to use mobile devices and, as stated above, their accuracy is even poorer than that of a map. Uncertain navigation is made even more difficult by a possibly tight timetable, as well as uncertainty as to the location of the end point.

SUMMARY OF THE INVENTION

The invention is intended to create a new type of navigation system, which is simpler and easier to use than previously. In addition, the invention is intended to create a new type of navigation method, which is suitable for even very crowded locations. The characteristic features of the navigation system according to the invention are stated in the accompanying claim 1. Correspondingly, the characteristic features of the navigation method according to the invention are stated in the accompanying claim 12. In the navigation system and method according to the invention, a simple appliance and easily discernable markings are utilized. Navigation is easy and will succeed even in a crowd. In addition, the route is always optimized and up-to-date, so that reaching the end point is ensured even in a hurry.

BRIEF DESCRIPTION OF THE DRAWINGS

In the following, the invention is described in detail with reference to the accompanying drawings depicting some embodiments of the invention, in which.

DETAILED DESCRIPTION OF THE INVENTION

Figure 1:
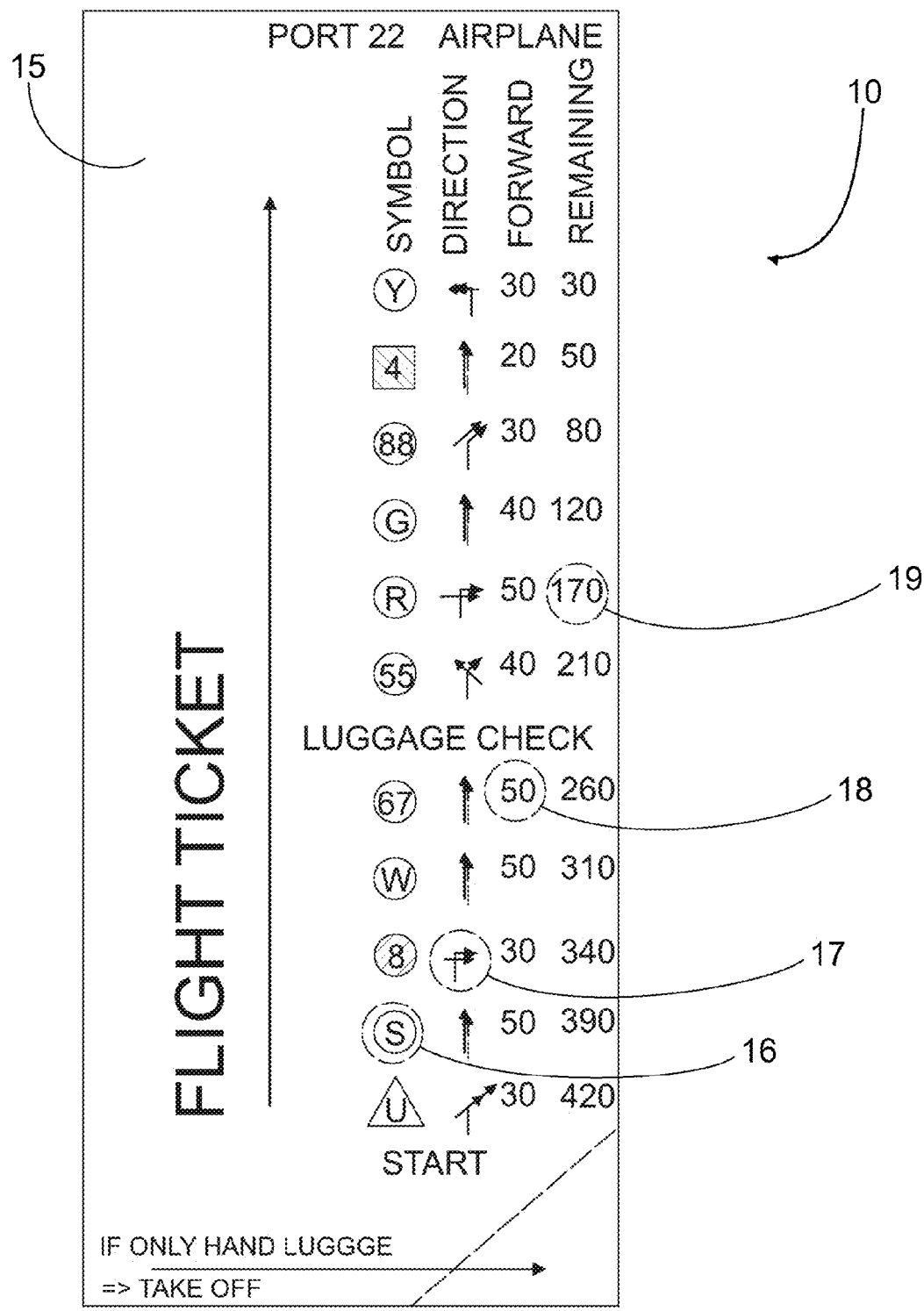
FIG. 1 shows the appliance according to the invention.
Figure 2:
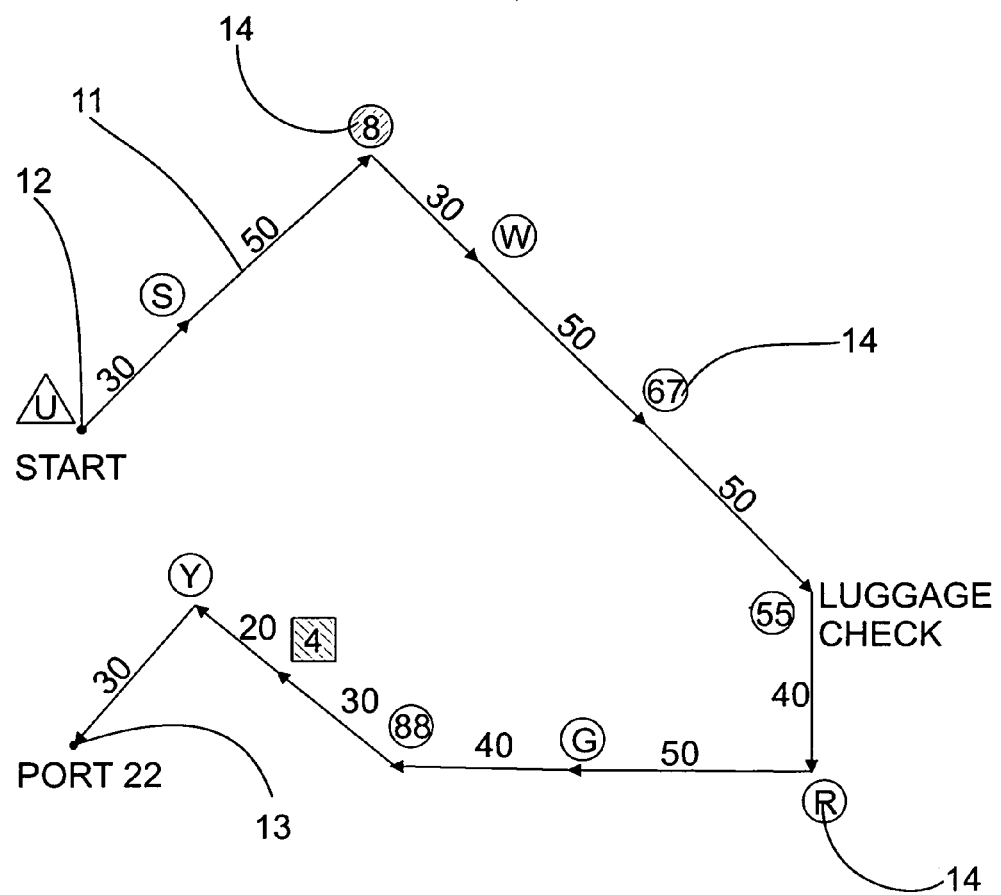
FIG. 2 shows schematically the application of the navigation system according to the invention.

FIG. 1 shows the appliance 10 according to the invention, which is utilized in the navigation system. Stated generally, the navigation system includes an appliance 10 for finding a desired route 11 from a starting point 12 to an end point 13 (FIG. 2). The navigation system according to the invention includes explicit markings 14 discernable by the senses, and which are located on the route 11. In addition, the markings 14 on the route 11 are arranged in the appliance 10 in the order of progression. The route 11 and the markings 14 located along it are shown in FIG. 2.

Thus, in the navigation method, a desired route 11 from a starting point 12 to an end point 13 is found with the aid of an appliance 10. Explicit markings 14 discernable by the senses, which are located on the route 11 preferably within visible distance of the previous marking, are used in the navigation system according to the invention. In addition, the markings 14, which are on the route 11, are arranged in the order of progression in the appliance 10, so that the desired route 11 can be found on the basis of the markings arranged in the appliance 10. Thus, in the navigation method, the route is sought with the aid of markings and the position at any moment will also be known the whole time.

Figure 3:
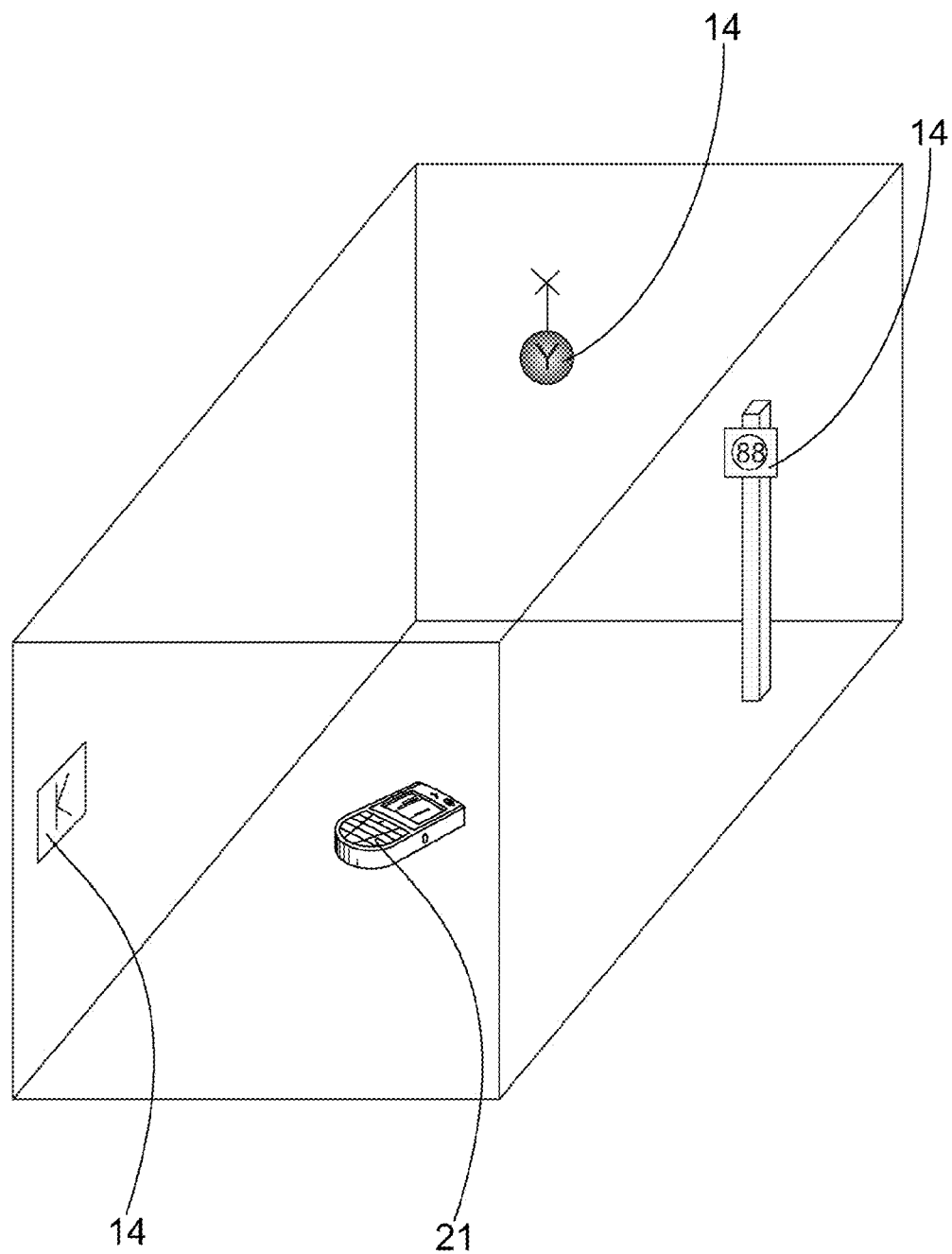
FIG. 3 shows schematically the placing of markings in a building.

In the embodiment shown, the appliance 10 is a ticket 15 (FIG. 1). In this case, the navigation system is arranged in a passenger terminal and the route to be navigated is, for example, from the check-in point to the gate from which the flight departs. According to the invention, information 16 on the following marking 14, as well as information 17 on the direction in which it will appear, is arranged in the appliance 10. In other words, the information 16 gives the following direction, for example, as an arrow compared to the previous direction of movement. Thus, the navigator knows to look in the correct direction and to seek the marking shown on the ticket. The information on the direction is preferably shown by means of a one or two-part arrow. The information 18 on the distance to the following marking 14 and the information 19 on the total distance remaining is preferably also arranged in the appliance 10. Thus, the navigator can estimate where the following marking is and how long the remaining distance is to the end point, such as a gate. This is important information especially when transferring to connecting flights, when there is often little time available. Shapes and/or colours, which are shown with geometric shapes and shading in FIGS. 1 and 2, are preferably used in the marking 14. Numbers and letters can also be utilized. The markings can be placed in different ways, but the marking 14 is preferably arranged essentially higher than the navigator, for example on a wall or hanging from the ceiling, or attached to a post (FIG. 3). Generally, on the appliance 10 information 16, 17, 18, 19 is arranged of the following marking 14, the direction in which the following marking 14 will appear, the distance to the following marking 14, and/or of the total remaining distance. In this way, the navigator will be sure to remain on the route and know the whole time at which stage on the route he is. In the ticket, there is preferably a clearly discernable arrow, which shows the order in which the markings should be sought.

For example, in a terminal the markings are arranged in the appliance immediately prior to starting on the route. The gate to which the passenger should go will then generally be already known. In other words, the route and markings are printed on the ticket either after the ticket has been printed or in connection with its printing. The printing is preferably arranged at the check-in point or some similar place, where the passenger first arrives. All the necessary operations can then be performed at one place and in the earliest stage possible, so that the passenger will immediately receive the optimal route, without having to wander around the terminal. This will save time and trouble. In the example, there is also a tear-off portion in the lower corner of the ticket, by removing which the printing device detects that the passenger has only hand baggage. In other words, if the lower corner is torn off, the printer detects this and makes an interpretation of the route. The route printed can then be even more direct and shorter. Correspondingly, the route can include different points to visit, which the navigator reaches along an optimal route. In addition, information can be arranged in the appliance of two or more alternatives for the route. The choice of route can be made during the journey, or the choice of route can be based on, for example, the torn-off lower corner.

Balls or cubes, with a diameter of, for example, 300 -500 mm (FIG. 3), can be placed under the ceiling of the airport, or at a height of at least about three meters. In the items there can be, for example, numbers or letters and they can be of different colours and shapes. Illumination can also be used as augmentation. As an airline ticket has information on the destination, then by using the ticket in some device in an airport, the correct markings with their directions and distances can be printed on its edge. The device is preferably connected to the computers of the airline or air-traffic control, so that the location of the next gate will then be sure to be known to be correct just before transferring to the following flight. The passenger would receive on the edge of the ticket the direction to leave the arrival hall and information on each of the following markings or control points. Such information could be, for example, the number/letter of the following control point in the correct colour, the direction in which to continue from the control point relative to the direction of arrival, how much of the total trip is still left in meters, and how far the following point is in meters. When transferring flights, information on the markings could be downloaded, for example at the arrival gate of the incoming flight at the airport, but also elsewhere along the route. When departing for a flight, the information could be downloaded, for example at the entrance to the airport.

The markings fit on a width of a few centimeters and could be printed, for example on the back of the airline ticket, or on a separate slip. However, the navigator will have so many control points in the order of progression that they will again reach the correct gate. The control points can be at, for example, intervals of 20-50 m, so that sensory detection will succeed despite a crowd. There can be a control point between the departure gates too, so that the passenger will be sure to start in the correct direction. The system can also be utilized when deplaning. In that case, an exit route direct to the exit doors or baggage claim can be printed on the ticket. Guidance, for example, to the correct connection, such as buses, metro, trains, can also be added to the ticket.

Figure 4:
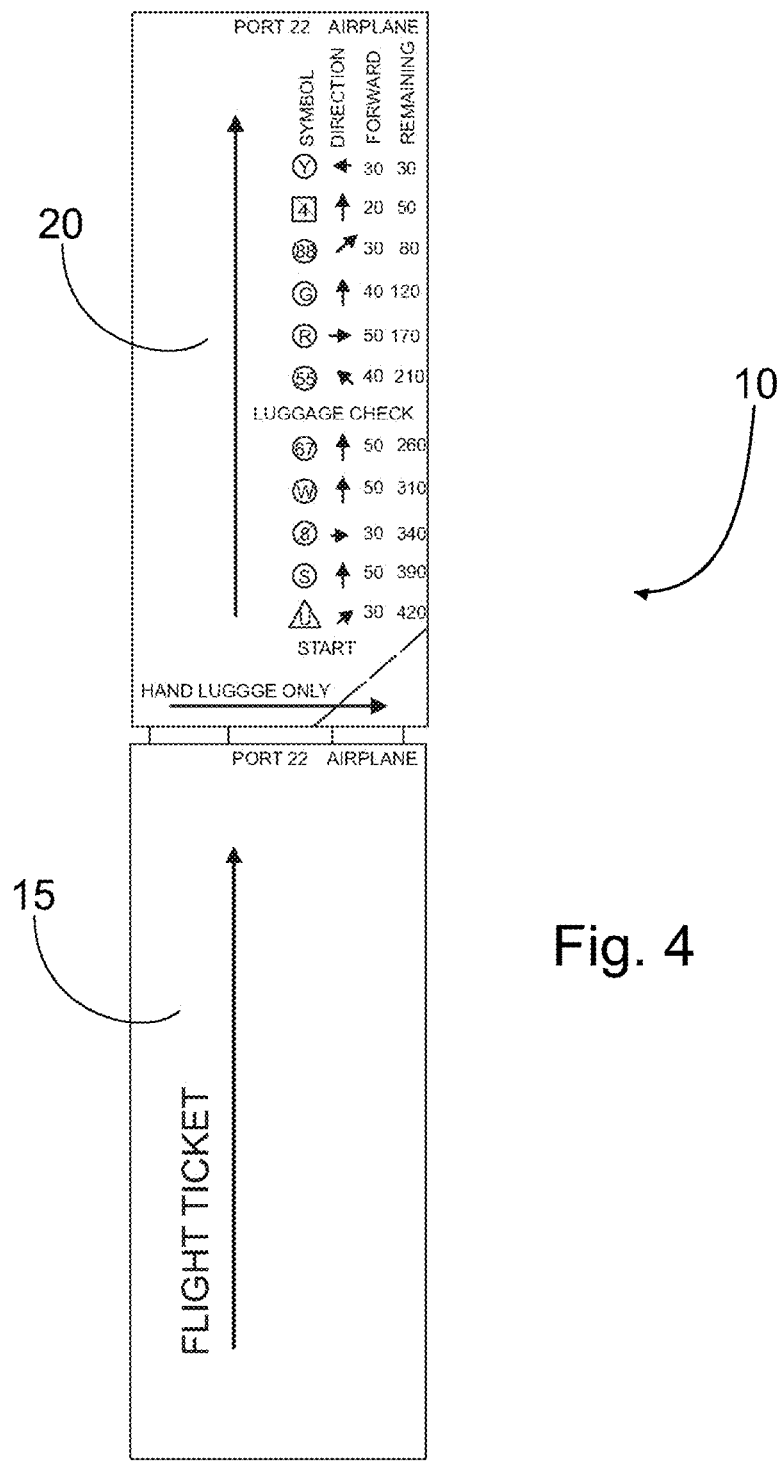
FIG. 4 shows a variation of the navigation system according to the invention.

FIG. 4 shows a variation of the invention. Instead of a ticket 1, the markings can be printed on a separate slip, or a ticket blank 20 can be used. In that case, the ticket 15 and the blank 20 equipped with markings remain attached to each other. If desired, they can be detached from each other. A miniature map, on which the route is marked could also be printed.

Figure 5:
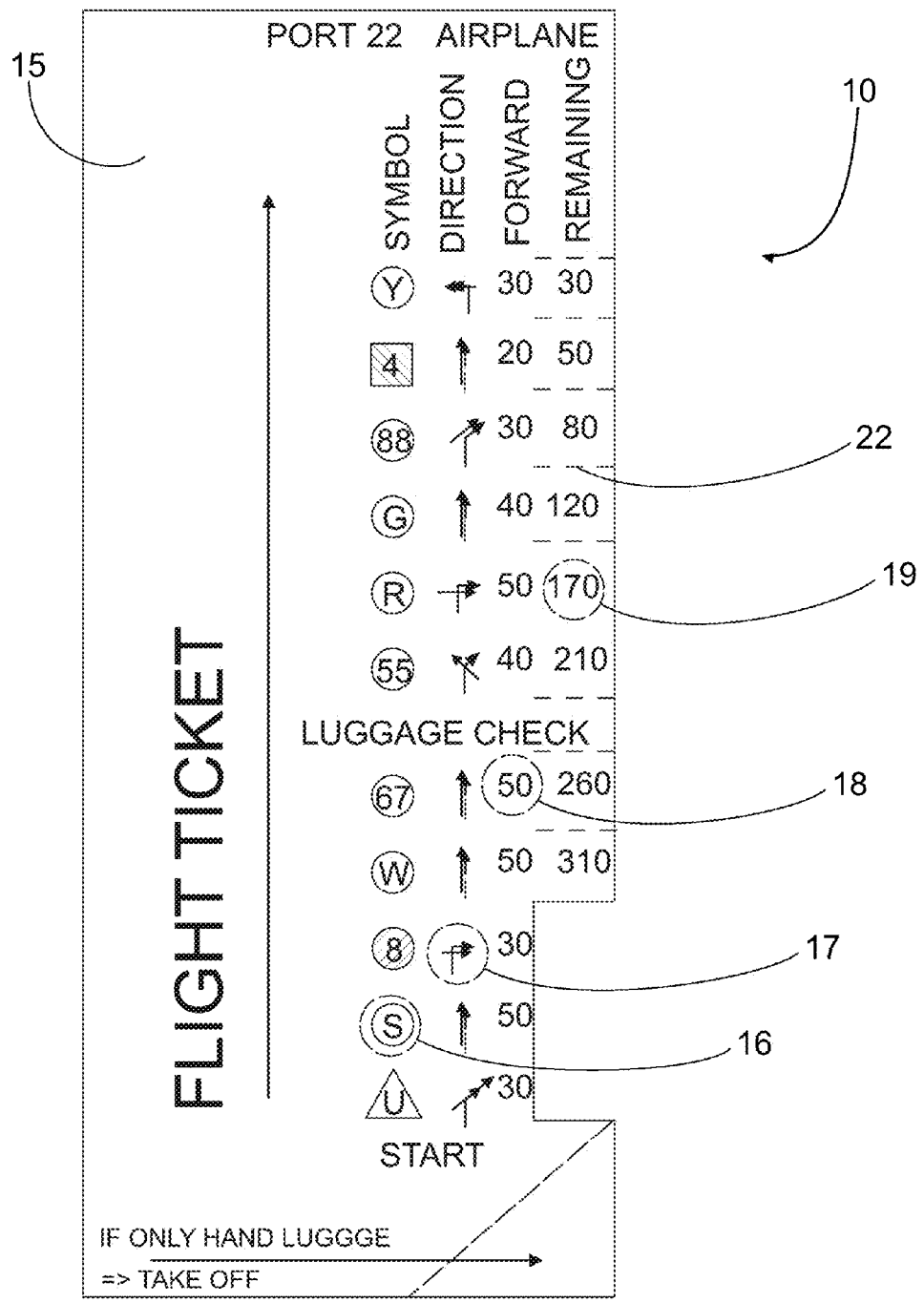
FIG. 5 shows a second variation of the navigation system according to the invention.

FIG. 5 shows a second variation of the invention. In this case, perforation 22 is arranged between the markings. Thus the ticket can be bent at a point which the passenger has already passed. Thus, the current position will always be known, which will prevent becoming lost. The passenger can also stop, for example at a café and continue navigation on the basis of the remaining markings. Instead of perforation, some other shaping can also be used in the ticket. In FIG. 5, a fold has been made at the location of the first row of information.

The navigation system and method according to the invention are simple and easy to use. Navigation will succeed without electronic devices, but information like that in car navigation will nevertheless be obtained. In addition, navigation will succeed without maps, as the following marking can be seen from the previous marking. This will make it possible to avoid bringing paper into the terminal and waste problems will not arise. Also the laborious updating of the maps stays away. When the terminal structures and thus the markings or their locations change, it will be sufficient to update the system. The passenger will receive clear instructions from the ticket on moving is a difficult environment over a selected route, without additional devices or maps. In addition, the acquisition and maintenance costs of the system are low.

The principle can also be applied in electronic mobile devices 21, such as, for example, mobile telephones. For example, information on the selected route could be downloaded already in the arrival hall. This would work particularly if the check-in was performed by phoning. After or during the call the information on the route would be downloaded to the mobile phone. A browser-based check-in would also be possible, in which case the information would be downloaded to the mobile device. Alongside the mobile device, it would also be possible to use the ticket described above. On the other hand, the mobile device's own systems could also be used in parallel with the system according to the invention.

The system can also include special support for mobile devices. A small area in the surroundings of the marking at the location of the marking could then be shown on the display of the mobile device, for example as a map or still image. The navigator could then check that he is at the location of precisely the correct marking. The still image could, in addition, be such that the following marking could already be seen in it. The still image to be displayed would then depend on what the following marking is.

The invention claimed is:

1. Navigation system, which includes an appliance for finding a desired route from a starting point to an end point, and the navigation system includes explicit markings discernible by senses, which are located on the route, characterized in that information on the following marking as well as information on the direction in which it appears is arranged in the appliance, and the markings on the route and both the information on the following marking and the information on the direction in which it appears are arranged in the application in the order of progression, from each marking there is a sensory connection to the following marking on the route, and the marking is arranged essentially higher than a navigator.

2. System according to claim 1, characterized in an information is arranged in the appliance on the distance to the following marking as well as an information on the remaining distance.

3. System according to claim 1, characterized in that the marking includes at least one of shape and color.

4. System according to claim 1, characterized in that the markings are located at intervals of 20-50 meters.

5. System according to claim 1, characterized in that the navigation system is arranged in a passenger terminal.

6. System according to claim 1, characterized in that the appliance is a ticket.

7. System according to claim 1, characterized in that at the location of each marking in the ticket there is a shaping, such as perforation, for recording the current position.

8. System according to any of claims 1, characterized in that the appliance is an electronic mobile device.

9. Navigation method, in which with the aid of an appliance a desired route is sought from a starting point to an end point, and in the navigation method explicit markings discernable by senses are used, which are located on the route, characterized in that information is arranged in the appliance of the following marking and the direction in which the following marking will appear, and the markings on the route and both the information on the following marking and the information on the direction in which it appears are arranged in the appliance in the order of progression, so that the desired route will be found on the basis of the markings arranged in the appliance, the markings are so arranged that from each marking there is a sensory connection to the following marking on the route, and the marking is arranged essentially higher than a navigator.

10. Method according to claim 9, characterized in that the markings are arranged in the appliance immediately prior to starting on the route.

11. Method according to claim 9, characterized in that an information is arranged in the appliance of the remaining total distance.

12. Method according to claim 9, characterized in that information is arranged in the appliance of the markings of two or more alternative routes.

13. Method according to claim 9, characterized in that a mobile device, on the display of which a small area of the surroundings of the marking, at the location of each marking, is shown.

* * * * *